United States Patent
Dupuis et al.

(10) Patent No.: US 10,209,098 B2
(45) Date of Patent: Feb. 19, 2019

(54) RADIAL POSITION SENSOR

(71) Applicants: Yves Dupuis, Saint-Just (FR); Joaquim Da Silva, Sennely (FR)

(72) Inventors: Yves Dupuis, Saint-Just (FR); Joaquim Da Silva, Sennely (FR)

(73) Assignee: SKF Magnetic Mechatronics, rue des champs, Saint-Marcel (FR)

( * ) Notice: Subject to any disclaimer, the term of this patent is extended or adjusted under 35 U.S.C. 154(b) by 0 days.

(21) Appl. No.: 15/259,151

(22) Filed: Sep. 8, 2016

(65) Prior Publication Data

US 2017/0067756 A1 Mar. 9, 2017

(30) Foreign Application Priority Data

Sep. 9, 2015 (EP) ..................................... 15306373

(51) Int. Cl.
*G01D 5/20* (2006.01)
*H02K 11/215* (2016.01)
*H02K 7/09* (2006.01)

(52) U.S. Cl.
CPC ......... *G01D 5/2046* (2013.01); *G01D 5/2013* (2013.01); *H02K 7/09* (2013.01); *H02K 11/215* (2016.01)

(58) Field of Classification Search
CPC ........................... G01D 5/2046; G01D 5/2013
See application file for complete search history.

(56) References Cited

U.S. PATENT DOCUMENTS

| | | | | |
|---|---|---|---|---|
| 4,245,869 | A | * | 1/1981 | Scheffer ................ F16C 32/048 310/90.5 |
| 4,841,204 | A | | 6/1989 | Studer |
| 2004/0164632 | A1 | | 8/2004 | Brunet et al. |
| 2010/0036640 | A1 | | 2/2010 | Chassoulier et al. |
| 2012/0262158 | A1 | * | 10/2012 | Matsuura ............. G01D 5/2046 324/207.17 |
| 2014/0062379 | A1 | * | 3/2014 | Dai ........................ H02P 25/08 318/701 |

FOREIGN PATENT DOCUMENTS

FR          2630542 A1     10/1989

* cited by examiner

*Primary Examiner* — Walter L Lindsay, Jr.
*Assistant Examiner* — Milton Gonzalez
(74) *Attorney, Agent, or Firm* — Bryan Peckjian; SKF USA Inc. Patent Dept.

(57) ABSTRACT

A radial position sensor that measures a radial position of a rotor within a stator is provided. The radial position sensor provides measures the radial position of the rotor along a first axis radial to a rotation axis of the rotor and along a second axis perpendicular to the first axis. The radial position sensor includes four magnetic poles, among which two poles are diametrically opposed along the first axis and two other poles are diametrically opposed along the second axis.

9 Claims, 4 Drawing Sheets

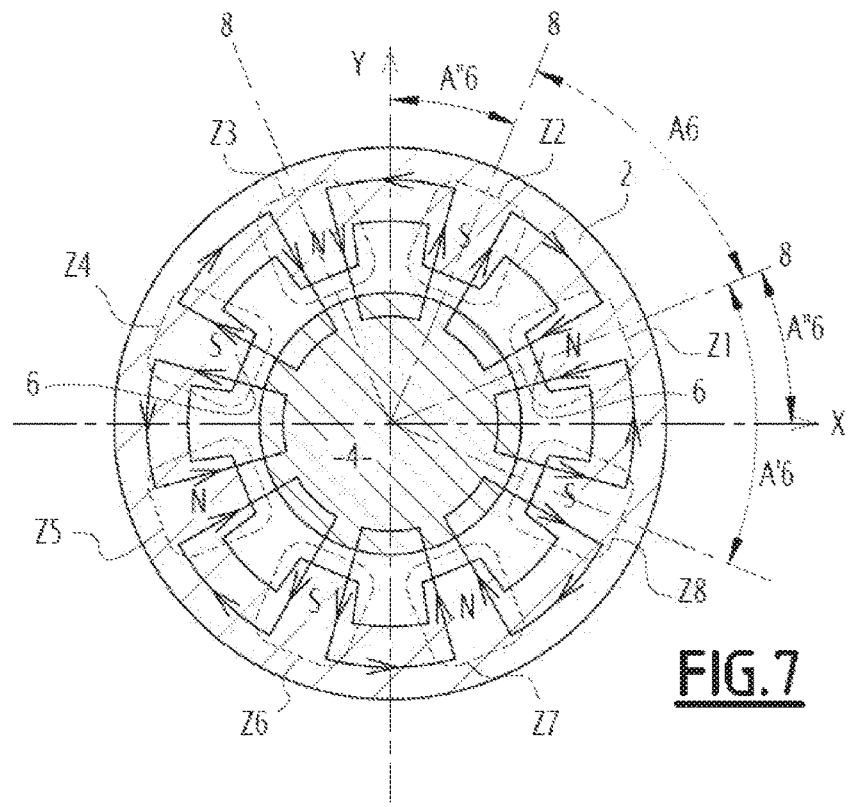
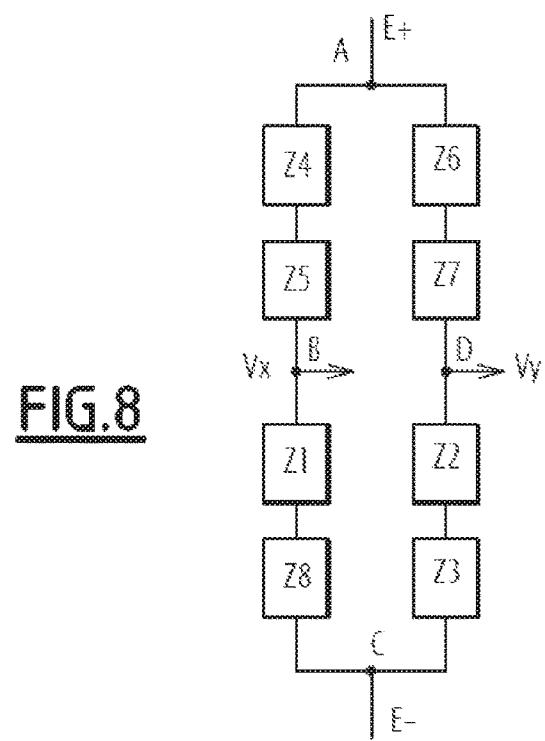
FIG.7
FIG.8

RADIAL POSITION SENSOR

CROSS REFERENCE TO RELATED APPLICATIONS

This application claims priority to European patent application no. 15306373.0 filed on Sep. 9, 2015, the contents of which are fully incorporated herein by reference.

FIELD OF THE INVENTION

The invention concerns a radial position sensor for measuring the radial position of a rotor within a stator. In particular, this sensor may be integrated to an electrical rotary machine or to a magnetic bearing, both comprising a fixed part, i.e. a stator, and a rotating part, i.e. a rotor.

BACKGROUND OF THE INVENTION

FIG. 1 represents an 8 poles radial position sensor from prior art. This sensor is capable of rejecting even harmonics representative of rotor defects. Indeed, the rotor is never perfectly cylindrical. The sensor includes eight magnetic poles arranged on the inner surface of the stator. Each pole is formed by an electromagnet. The electromagnets are divided into four pairs. The electromagnets of each pair have opposed magnetic polarities and are connected in series. A pair of electromagnets forms then a dipole. The magnetic polarity of an electromagnet corresponds to the orientation of the generated magnetic field. It is referenced by letter "N" or "S" on FIG. 1, respectively for North or South. The magnetic field generated by each electromagnet in the air gap is radial with respect to the rotation axis of the rotor.

BRIEF SUMMARY OF THE INVENTION

As it can be seen on FIG. 1, the magnetic field lines are intrinsic to a dipole. The magnetic field lines are loops running along a first electromagnet of the dipole, along a portion of the rotor, along the second electromagnet of the dipole and along a portion of the stator joining the two electromagnets. The magnetic field lines are represented with arrows on FIG. 1. The four dipoles are referenced D1, D2, D3 and D4 and are wired into a bridge circuit that is represented on FIG. 2. As a result, dipoles D1 and D3 are connected in series and are diametrically opposed along a first axis X. Dipoles D2 and D4 are connected in series and are diametrically opposed along a second axis Y perpendicular to axis X. The bridge circuit includes four nodes A, B, C and D between the dipoles D1 to D4 and is excited with an input voltage applied between nodes A and C. E+ denotes the potential at node A and E− denotes the potential at node C. Vx and Vy denote respectively the potential at nodes B and D.

A displacement of the rotor in X-direction involves a modification of the magnetic field generated by the electromagnets of dipoles D1 and D3. Consequently, the self-inductance of the electromagnets of the dipoles D1 and D3 varies and the impedance of dipoles D1 and D3 varies accordingly. This variation can be detected on the basis of Vx signal which leads to the amplitude of the rotor displacement along X-axis. In the same way, the measure of Vy signal leads to the amplitude of the rotor displacement along Y-axis.

A more sophisticated sensor is represented on FIG. 3. This sensor is a 16 poles radial position sensor comprising eight pairs of electromagnets arranged on the inner surface of the stator. As the radial position sensor of FIG. 1, the 16 poles radial position sensor has two measurement axes X and Y that are perpendicular to each other and the electromagnets of each pair have alternating magnetic polarities and form together a dipole. D1 to D8 denote the eight dipoles. Reference 7 denotes a symmetry axis of the dipoles D1 to D8. The symmetry axis 7 of any one of the dipoles D1 to D8 delimits with the nearest axis X or Y an angle A7 of 30°. As a result, the angle between the symmetry axes 7 of dipoles D1 and D4, D2 and D7, D3 and D6 and D5 and D8 is equals to 120°. In comparison with the 8 poles radial position sensor of FIG. 1, a 16 poles radial position sensor is then capable of rejecting, in addition to even harmonics, odd harmonics whose the remainder of the Euclidean division by 6 is 3. (3 modulo 6 harmonics) This sensor is suited for large electrical machines. These harmonics are representative of surface defects of the rotor.

The eight dipoles are wired into a bridge circuit represented on FIG. 4. The bridge circuit includes four nodes A, B, C and D between the dipoles D1 to D8 and is excited with an input voltage applied between nodes A and C. E+ denotes the potential at node A and E− denotes the potential at node C. Vx and Vy denote respectively the potential at nodes B and D. Dipoles D4 and D5 are connected in series between nodes A and B, dipoles D1 and D8 are connected in series between nodes B and C, dipoles D3 and D2 are connected in series between nodes C and D and dipoles D7 and D6 are connected in series between nodes D and A.

The measure of the potential Vx at node B allows deducing the rotor displacement along axis X, while the measure of the potential Vy at node D of the circuit allows deducing the rotor displacement along axis Y These known radial position sensors are complicated to manufacture due to the number of coils to wind. Further, coils are too close from each other to be wound automatically. As a result, winding process is very time consuming. For instance, it takes about two days to wind all of the coils of an 8 poles radial position sensor. Besides, this entails a problem of interconnections reliability.

The invention intends to solve these drawbacks by proposing a radial position sensor that is easier to manufacture, while offering the same measuring accuracy.

To this end, the invention concerns a radial position sensor according to claim 1.

Thanks to the invention, the sensor includes two times less electromagnets than prior art radial position sensors, for a similar measuring accuracy. There is then two times less coils to wind and less copper is used. Further, coils are more spaced from each other so that winding can be performed automatically. Besides, the sensor is less sensitive to rotor surface defects. This sensor provides the same performances in terms of linearity, sensitivity and power consumption than a corresponding sensor from prior art. In other words, an 8 poles radial position sensor according to the invention can replace a 16 poles radial position sensor from prior art and a 4 poles radial position sensor according to the invention can replace an 8 poles radial position sensor from prior art.

Further aspects of the invention that are advantageous but not compulsory are specified in claims 2 to 9.

The invention also concerns an electrical rotary machine as defined in claim 10.

The invention also concerns a magnetic bearing as defined in claim 11.

BRIEF DESCRIPTION OF THE SEVERAL VIEWS OF THE DRAWING

The invention will now be explained in correspondence with FIGS. 1 to 8, among which:

FIG. 7 represents a second embodiment of a radial position sensor according to the invention, and FIG. 8 represents a bridge circuit associated to the sensor of FIG. 7.

DETAILED DESCRIPTION OF THE INVENTION

Figure 5:
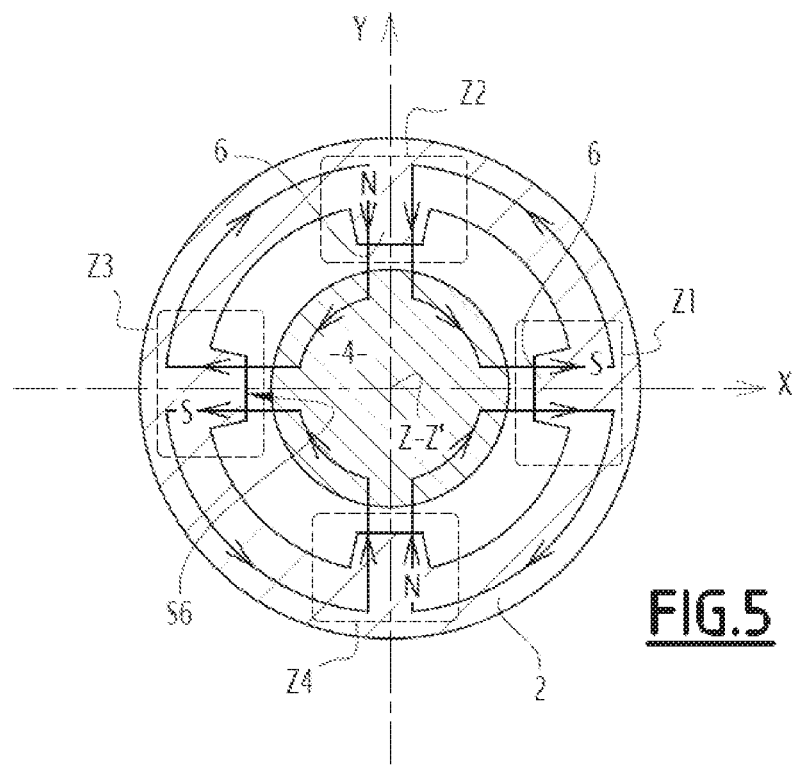
FIG. 5 represents a first embodiment of a radial position sensor according to the invention.

FIG. 5 represents a radial position sensor for measuring the radial position of a rotor 4 within a stator 2. The rotor 4 is made of ferromagnetic material. The sensor includes four poles. Each pole is formed by an electromagnet Z1, Z2, Z3 or Z4. The electromagnets Z1, Z2, Z3 and Z4 are arranged on the inner surface of stator 2. The sensor is then a 4 poles radial position sensor. As the sensor of FIG. 1, this sensor is capable of rejecting even harmonics representative of rotor defects. Indeed, the rotor is never perfectly cylindrical.

The electromagnets Z1, Z2, Z3 and Z4 include each a non-represented coil that is wound around a core 6 protruding internally with respect to the inner surface of the stator 2. Each coil has the same number of turns. This number of turns is the same than that of coils belonging to prior art sensors. The electromagnets Z1 to Z4 are distributed with alternating magnetic polarities N, S around the entire circumference of the stator 2 and with an angle of 90° between each other. This means that any successive poles from end-to-end along a peripheral direction have opposed magnetic polarities, respectively North and South. The peripheral direction is defined by a non-represented orientation vector that is orthoradial with respect to a rotation axis Z-Z' of rotor 4. The magnetic polarity of an electromagnet is determined by the direction of the electric current running through the coil of the electromagnet.

In the embodiment of FIG. 5, the poles Z1 to Z4 are evenly distributed in the peripheral direction. Poles Z1 and Z3 are diametrically opposed along an axis X, while poles Z2 and Z4 are diametrically opposed along an axis Y perpendicular to axis X. Axes X and Y are perpendicular to axis Z-Z'.

Figure 6:
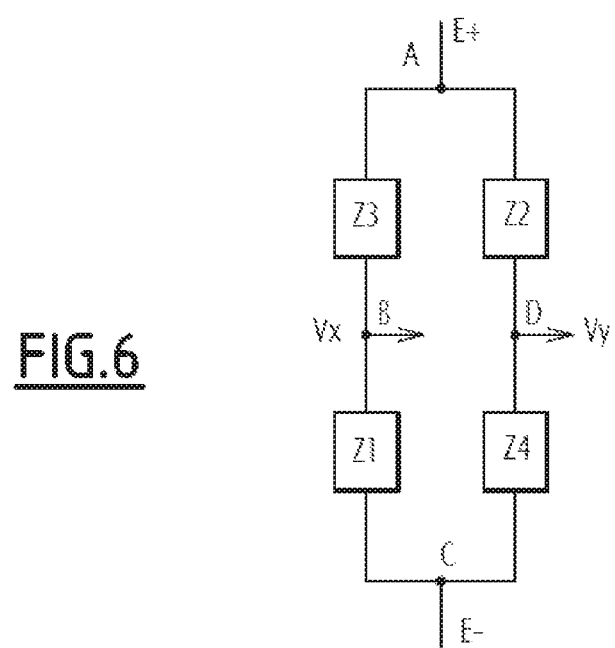
FIG. 6 represents a bridge circuit associated to the sensor for FIG. 5.

Electromagnets Z1 to Z4 are wired into a bridge circuit that is represented on FIG. 6. As it can be seen on this figure, electromagnets Z1 and Z3 are connected in series and electromagnets Z2 and Z4 are connected in series. The bridge circuit includes four nodes A, B, C and D between the poles Z1 to Z4 and is excited with an input voltage applied between nodes A and C. E+ denotes the potential at node A and E− denotes the potential at node C. The input voltage is the potential difference between nodes A and C. This input voltage is a sinusoidal signal having a frequency approximately equals to 20 kHz.

Vx and Vy denote respectively the potential at nodes B and D. Vx signal corresponds then to the potential between electromagnets Z1 and Z3, while Vy signal corresponds to the potential between electromagnets Z2 and Z4. A displacement of the rotor 4 in X-direction involves a modification of the self-inductance of the electromagnets Z1 and Z3. For instance, if the rotor 4 moves to the right along X-axis on FIG. 5, the impedance of electromagnet Z1 increases, while the impedance of electromagnet Z3 decreases. The bridge circuit is then unbalanced. Vx and Vy signals are output signals proportional to the rotor displacement along axes X and Y. Thus, the rotor displacement in any radial direction is decomposed in a displacement along X-axis and a displacement along Y-axis, which are measured independently. The sensor includes non-represented means for measuring output signals Vx and Vy and for deducting the radial displacement of the rotor 4 with respect to its initial position.

Therefore, a first group of poles Z1, Z3 is dedicated to measure the rotor displacement along X-axis and a second group of poles Z2, Z4 is dedicated to measure the rotor displacement along the Y-axis.

Figure 1:
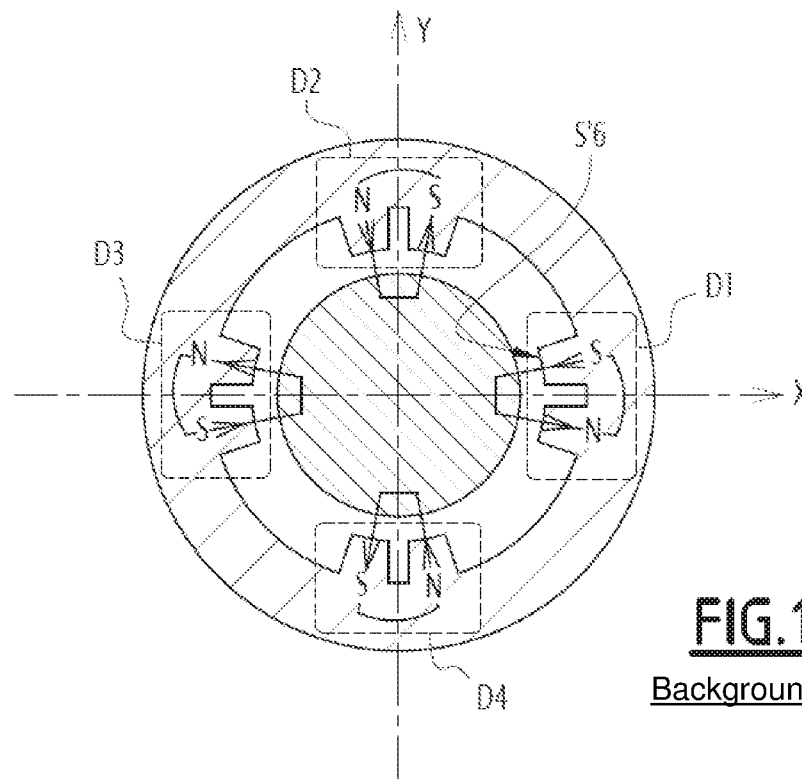
FIG. 1 represents a first radial position sensor from prior art.
Figure 2:
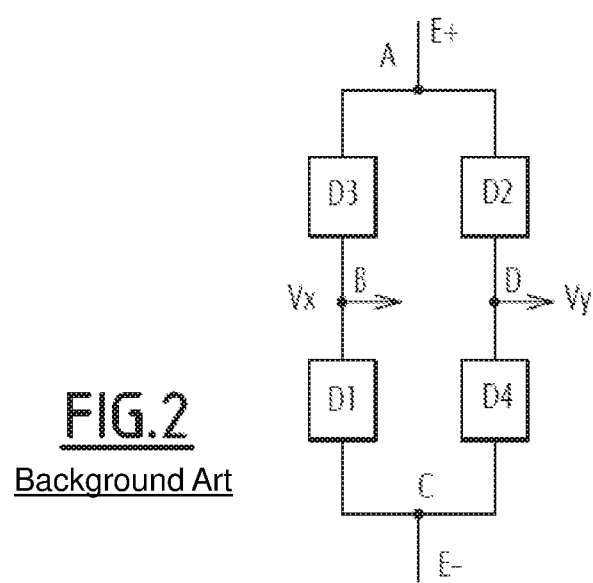
FIG. 2 represents a bridge circuit associated to the radial position sensor of FIG. 1.

As it can be seen on FIG. 5, the magnetic field lines of the sensor, represented with arrows on FIG. 5, are completely different from that of the sensor of FIG. 1. Indeed, each magnetic field line is a loop running along a first electromagnet, along a portion of the rotor, along a second electromagnet adjacent to the first electromagnet and along a portion of the stator joining the two successive electromagnets. As a result, each magnetic field line is common to two successive electromagnets. This entails that the poles are arranged so that any successive poles along peripheral direction are coupled by mutual inductance, which means that there is a magnetic interaction between any successive electromagnets. This is different from the arrangement of the sensor of FIG. 1, wherein the dipoles D1 to D4 have no magnetic interaction. This means that there is no mutual inductance between some successive poles.

S6 denotes the radial surface of the cores 6 facing radially rotor 4. This surface S6 is two times bigger than a surface S'6 of a corresponding core belonging to an electromagnet of the prior art sensor of FIG. 1. As a result, the electromagnets of the sensor according to the invention are less sensitive to surface defects of the rotor. Another advantage is that the cores 6 around which are wounded the coils have a diameter that is two times bigger than that of the cores of the sensor of FIG. 1. As a result, the bending radius of the coils is also two times bigger. This eases the winding process.

The sensor of FIG. 5 provides the same performances in terms of linearity, sensitivity and power consumption than the prior art sensor of FIG. 1, while including two times less electromagnets.

FIG. 7 represents a radial position sensor according to a second embodiment of the invention. For concision purpose, only the distinctive features with respect to the first embodiment are depicted below. Moreover, the radial position sensor according to the second embodiment yields the same kind of benefits as with the 4 poles radial position sensor of FIG. 5. These advantages are described here-above in relation to the 4 poles radial sensor.

Sensor represented on FIG. 7 is an 8 poles radial position sensor having 8 poles formed by electromagnets Z1 to Z8 distributed with alternating magnetic polarities N, S around the entire circumference of the stator 2. In the example of FIG. 7, poles of electromagnets Z1, Z8, Z4 and Z5 are dedicated to measure the rotor displacement along a first axis X, while poles of electromagnets Z2, Z3, Z6 and Z7 are dedicated to measure the rotor displacement along a second axis Y.

The electromagnets Z1 to Z8 are unevenly distributed along the peripheral direction. The angle between two successive poles along the peripheral direction is alternatively of 30° and 60°. On FIG. 7, A6 denotes the angle of 30°, while A'6 denotes the angle of 60°. The angles A6 and A'6 are measured between the central axes 8 of the two successive electromagnets forming the poles. The central axis 8 of any one of the electromagnets Z1 to Z8 delimits with the nearest axis X or Y an angle A"6 of 30°. This angle A"6 corresponds to half of the angle A'6. In other words, the eight magnetic poles formed by the electromagnets Z1 to Z8 are arranged so that each pole deviates by an angle A"6 of 30° from the nearest axis among the first axis X and the second axis Y. As a result, the angle between the central axes 8 of the electromagnets Z1 and Z4, Z2 and Z7, Z3 and Z6 and Z5 and Z8 is equals to 120°. This sensor is then capable of rejecting, in addition to even harmonics, odd harmonics whose the remainder of the Euclidean division by 6 is 3. (3 modulo 6 harmonics) In the example, the angle A"6 is equals to 30° but in practice, the angle A"6 is approximately equals to 30°, with a tolerance of +/−5°.

The electromagnets Z1 to Z8 are wired into a bridge circuit depicted on FIG. 8. The bridge circuit includes four nodes A, B, C and D and is excited with an input voltage applied between nodes A and C. E+ denotes the potential at node A and E− denotes the potential at node C. The input voltage is the potential difference between nodes A and C. The electromagnets Z4, Z5, Z1 and Z8 are connected in series between nodes A and C and the electromagnets Z6, Z7, Z2 and Z3 are connected in series between nodes A and C. In particular, electromagnets Z4 and Z6 are connected to node A, while electromagnets Z8 and Z3 are connected to node C.

Vx and Vy denote respectively the potential at nodes B and D. Node B is the node between electromagnets Z5 and Z1 and node D is the node between electromagnets Z2 and Z7. Vx is a signal representative of the rotor displacement along X-axis and Vy is a signal representative of the rotor displacement along Y-axis.

Figure 3:
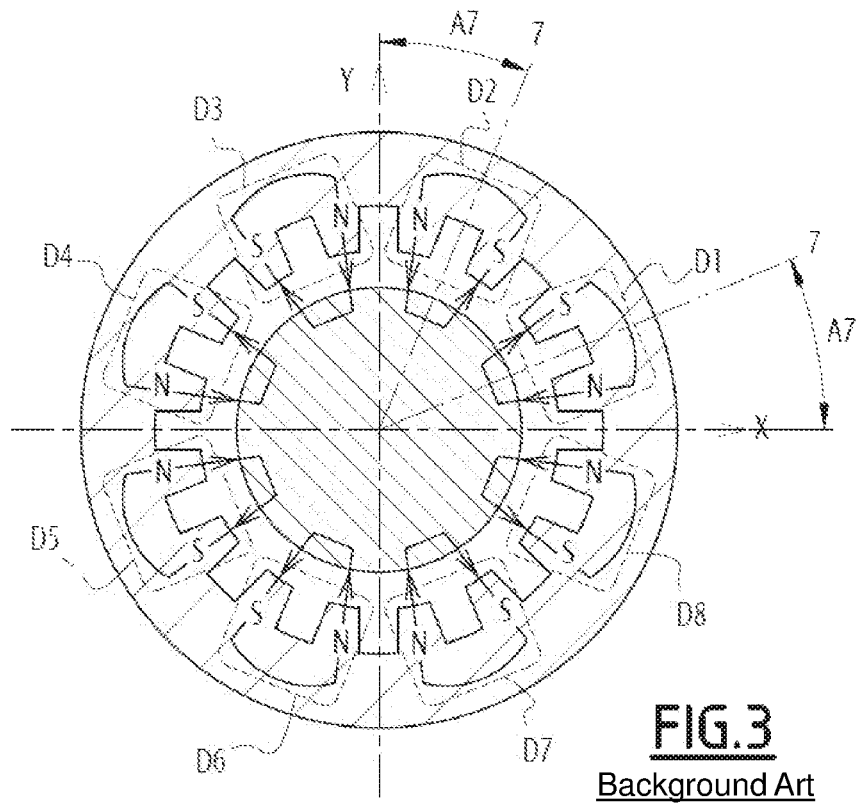
FIG. 3 represents a second radial position sensor from prior art.
Figure 4:
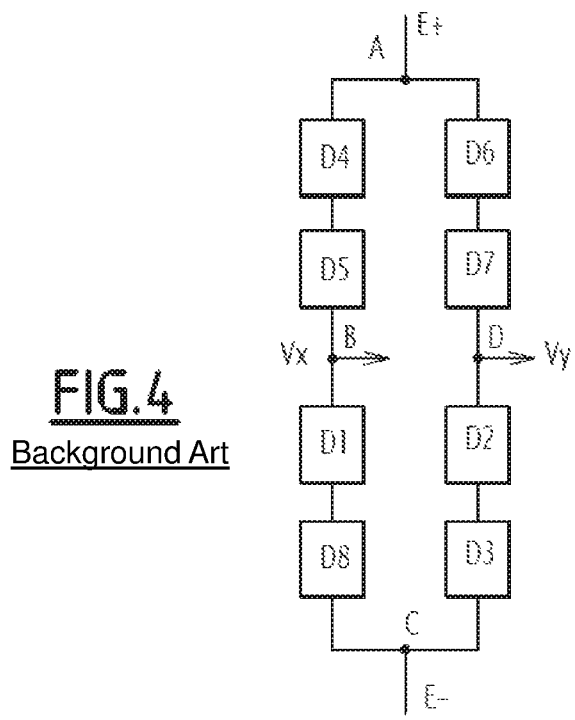
FIG. 4 represents a bridge circuit associated to the radial position sensor of FIG. 3.

The sensor of FIG. 7 provides the same performances in terms of linearity, sensitivity and power consumption than the prior art sensor of FIG. 3, while including two times less electromagnets.

The sensors of FIGS. 5 and 7 may be integrated to an electrical rotary machine, in particular to an electrical motor, or to a magnetic bearing.

The invention claimed is:

1. A radial position sensor for measuring the radial position of a rotor within a stator, the sensor comprising: measuring means configured for measuring the position of the rotor along a first axis (X) radial to a rotation axis (Z-Z') of the rotor and along a second axis (Y) perpendicular to the first axis, and including eight magnetic poles that are distributed, on the inner surface of the stator, with alternating magnetic polarities (N, S) around the entire circumference of the stator and that are arranged so that each pole deviates by an angle of approximately 30° from the nearest axis among the first axis (X) and the second axis (Y), wherein each pole is formed by an electromagnet, wherein the poles are arranged so that any successive poles along a peripheral direction are coupled by mutual inductance to induce magnetic interaction between any successive electromagnets.

2. The radial position sensor according to claim 1, wherein the angle is measured between the central axis of the electromagnet forming the pole and the first axis (X) or the second axis (Y).

3. The radial position sensor according to claim 1, wherein the electromagnets are wired into a bridge circuit.

4. The radial position sensor according to claim 3, wherein the bridge circuit includes four nodes (A, B, C, D) separating the electromagnets and an input voltage is applied between two first nodes (A, C) of the circuit.

5. The radial position sensor according to claim 4, wherein the radial position sensor measures output signals (Vx, Vy) of the bridge circuit representative of the radial displacement of the rotor within the stator and the output signals are the potential values (Vx, Vy) at two second nodes (B, D) of the circuit.

6. The radial position sensor according to claim 5, wherein a first output signal (Vx) is representative of the rotor displacement along the first axis (X) and the second output signal (Vy) is representative of the rotor displacement along the second axis (Y) perpendicular to the first axis.

7. The radial position sensor according to claim 1, wherein electromagnets each include a coil that is wound around a core and each coil has the same number of turns.

8. An electrical rotary machine, in particular an electrical motor including the radial position sensor according to claim 1.

9. A magnetic bearing including the radial position sensor according to claim 1.

* * * * *